Sept. 24, 1963   D. B. DAVIS ETAL   3,104,569
STUD BOLT REMOVER
Filed March 20, 1961
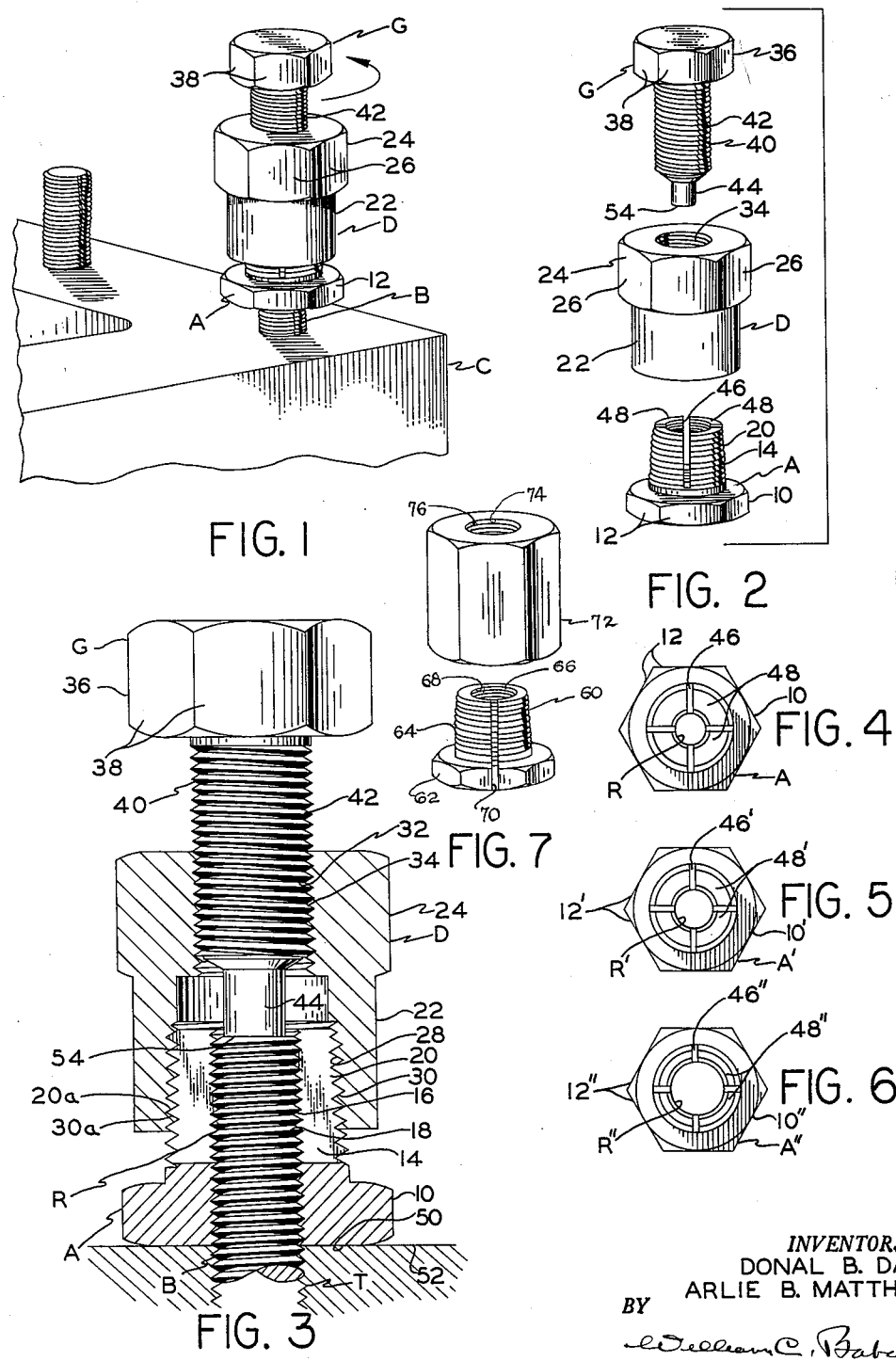
INVENTORS
DONAL B. DAVIS
ARLIE B. MATTHEWS
BY
William C. Babcock
ATTORNEY United States Patent Office 3,104,569
Patented Sept. 24, 1963

3,104,569
STUD BOLT REMOVER
Donal B. Davis, Long Beach, Calif. (2470 Foothill Blvd., San Bernardino, Calif.), and Arlie B. Matthews, 311 E. Maple St., Ontario, Calif.
Filed Mar. 20, 1961, Ser. No. 96,900
6 Claims. (Cl. 81—53)

The present invention relates generally to hand tools, and more particularly to a device for removing a stud bolt from a tapped bore.

The removal of a stud bolt from a tapped bore in which it has rusted, corroded or otherwise become bound is a particularly troublesome job. Although various types and designs of stud bolt removers have been devised in the past and used to a limited exent, these devices have- in the main, proved to be unsatisfactory, for if the stud bolt is removed, the threads thereon are usually so damaged that the stud bolt is of no future value. Also, these prior devices have met with but limited success, for when used to remove bolts which are bound unusually tight in tapped bores, they were unable to dislodge the same therefrom.

A major object of the present invention is to provide a stud bolt remover of extremely simple mechanical structure which is easy to use, can be fabricated from standard commercially available materials, and is capable of removing even the most tightly bound stud bolts from tapped bores with but little or no damage to the threads thereon.

Another object of the invention is to supply a stud bolt remover that will appreciably lessen the time required in removing stud bolts from engine blocks and similar structures in which stud bolts are used, and due to the simplicity thereof, can be sold at a sufficiently low price to encourage the widespread use thereof.

These and other objects and advantages of the invention will become apparent from the following description of a preferred form thereof, and from the drawing illustrating that form in which:

FIGURE 1 is a perspective view of the stud bolt remover assembled in a position to remove a stud bolt from a tapped bore;

FIGURE 2 is an exploded perspective view of the components comprising the remover;

FIGURE 3 is a longitudinally extending cross-sectional view of the invention;

FIGURES 4, 5 and 6 are each top plan views of tubular gripping members that can be used to remove stud bolts of varying diameter; and FIGURE 7 is a perspective view of an alternate form of the invention.

With further reference to the drawing for the general arrangement of the invention, it will be seen to include a tubular member A that is adapted to threadedly engage a stud bolt B mounted in a tapped bore T formed in a body C, such as an engine block, or the like. A nut D is provided that can be threaded onto the tubular member A to force this tubular member into frictional gripping contact with the stud bolt B.

A drive bolt G threadedly engages nut D in a direction opposite to that in which stud bolt B engages the tapped bore T. When bolt G is rotated in a direction to loosen stud bolt B from block C it causes the tubular member A to grip the stud bolt with an increasing force until the stud bolt is loosened and starts to rotate out of the tapped bore T.

The tubular member A is fabricated from a tough resilient metal such as steel or the like, and includes a shoulder 10 having a number of flat, wrench-engageable faces 12 formed on the circumferential edge portion thereof, as may best be seen in FIGURE 1. Member A also includes an elongate portion 14 that extends upwardly from shoulder 10. A longitudinally extending first bore R is formed in shoulder 10 and the elongate portion 14. First threads 16 are formed in first bore R and are adapted to engage threads 18 on stud bolt B. The exterior surface of portion 14 tapers upwardly and inwardly, and second threads 20 are formed thereon which are in the same direction as threads 18 on stud bolt B.

Nut D includes a cylindrical lower portion 22, the upper end of which merges into an enlarged portion 24. A number of wrench-engageable faces 26 are formed on the circumferential edge portion of portion 24. A second tapered bore 28 extends upwardly in lower portion 22, and threads 30 are provided in this second bore. Threads 30 are adapted to engage the second threads 20.

A third bore 32 extends longitudinally through the enlarged portion 24 in longitudinal alignment with second bore 28 and in communication therewith. Bore 32 has fourth threads 34 formed therein which are in a direction opopsite to the threads of bore T.

As may be seen in FIGURES 2 and 3, the drive bolt G includes a head 36 having a circumferentially extending edge surface on which a number of flat, wrench engageable faces 38 are formed. Head 36 has an elongate shank 40 extending therefrom on which fifth threads 42 are formed. An extension 44 projects from the lower end of shank 40, and extension 44 is preferably of smaller transverse cross section than that of shank 40.

A number of circumferentially spaced slots 46 extend downwardly in portion 14 from the upper end thereof, and these slots divide portion 14 into a number of fingers 48 that may bend inwardly to pressure contact threads 18 on stud bolt B.

Operation of the stud bolt remover of the present invention is relatively simple. The tubular member A is threaded onto the stud bolt B and rotated thereon until the lower surface 50 of shoulder 10 is in contact with the upper surface 52 of body C. Thereafter nut D is rotated relative to tubular member A to cause engagement of second threads 20 and third threads 30. Further rotation of nut D relative to member A causes the nut to move downwardly relative thereto and to concurrently bend the fingers 48 inwardly to forcefully and frictionally engage threads 18 on stud bolt B.

The shank 40 of drive bolt G is positioned in third bore 32. Rotation of bolt G in a direction to unscrew bolt B from tapped bore T effects rotation of fifth threads 42 relative to fourth threads 34. This rotation of threads 42 relative to threads 34 causes the drive bolt G to move downwardly in nut D until the lower end surface 54 of extension 44 contacts the upper end surface of stud bolt B. After surface 54 has contacted the stud bolt B, further forceful rotation of drive bolt G will not move the drive bolt downwardly relative to nut D, but on the other hand, will tend to raise the nut relative to the tubular member A. The upper surfaces of third threads 30 taper upwardly and outwardly and slidably engage lower surfaces 20a of threads 20 that are similarly oriented. As surfaces 30a tend to move upwardly relative to surfaces 20a, the surfaces 30a act as wedges and exert an inwardly directed force on fingers 48. As a result of this inwardly directed force, the fingers 48 are bent to frictionally contact the threads 18.

From an examination of FIGURES 2 and 3, it will be apparent that the greater the torque applied to drive bolt G by a wrench or other means not shown, the greater will be the inwardly directed force which bends the fingers 48 inwardly into frictional contact with threads 18. Increasing torque is applied to the drive bolt G until it and this inwardly directed force is sufficient to cause rotation of stud bolt B in tapped bore T to the extent that it can be removed therefrom.

Because the second threads 20 may be subjected to an upwardly directed shearing force of substantial magnitude by the third threads 30 as torque is applied to drive bolt G, it is highly desirable that threads 20 and 30 be sufficiently coarse to withstand this strain. It is also desirable that the wall section of the cylindrical lower portion 22 be sufficiently heavy that no appreciable circumferential enlargement thereof occurs during the time the third threads 30 tend to move upwardly relative to the second threads 20.

In the illustration of the stud remover shown in FIGURE 3 it will be seen that the stud bolt B was threaded into tapped bore T when rotated in a clockwise direction relative thereto. Therefore, the fifth threads 42 must be of such configuration that they must be rotated in a counterclockwise direction relative to fourth threads 34 in order to engage the same, if counterclockwise rotation of the drive bolt G is to tighten the frictional grip of the fingers 48 on threads 18 and concurrently tend to rotate stud bolt B out of tapped bore T.

In FIGURES 4, 5 and 6 top plan views of tubular members A, A' and A'' are shown that differ from one another only in the transverse cross-sectional area of the bore that extends therethrough and engages the stud bolt B. Inasmuch as the tubular members A' and A'' (FIGURES 5 and 6) are identical in structure to member A shown in FIGURE 4, the corresponding parts of members A' and A'' are identified by the same numerals used in conjunction with the tubular member A, but to which a prime and double prime, respectively, have been added.

An alternate form of the invention as shown in FIGURE 7, which includes a tubular member 60 that has a multi-faced head 62 on the lower end thereof. The exterior surface of member 60 above head 62 tapers inwardly and upwardly and left-hand threads 64 are formed thereon. A bore 66 extends longitudinally through member 60 and head 62. The bore 66 has right hand threads 68 formed therein that are adapted to engage threads 18 on stud bolt B. A slot 70 extends longitudinally through member 60 and head 62 as shown. A nut 72 is provided in which a tapered bore 74 is formed. Threads 76 are formed in bore 74 that are adapted to engage the threads 64.

The alternate form of the invention is used by threading tubular member 60 onto bolt B. Nut 72 may then be caused to engage threads 64. As nut 72 is rotated to cause further engagement of threads 64 and 76, the tubular member 60 is deformed inwardly, whereby a high frictional pressure contact is attained between threads 68 of the tubular member and threads 18 on stud bolt B.

The stud bolt B has right-hand threads 18 formed thereon, and as force is applied to nut 72 to cause further engagement of threads 64 and 76, the force is applied in a direction to cause the stud bolt B to rotate out of the tapped bore T. After the stud bolt B is removed from bore T, the tubular member 60 and nut 72 are disengaged therefrom, and kept until again needed.

Although the present invention is fully capable of achieving the objects and providing the advantages hereinbefore mentioned, it is to be understood that it is merely illustrative of the presently preferred embodiment thereof and we do not mean to be limited to the details of construction herein shown and described, other than as defined in the appended claims.

We claim:

1. A device for use in removing a stud bolt having a threaded portion projecting from a tapped bore formed in a rigid body, including:
   (a) a tubular member having an upper portion that defines an external surface which tapers upwardly and inwardly, and a bore that extends longitudinally through said member, which bore has first threads that engage said threaded portion, and said external surface has second threads formed thereon, with said upper portion having a plurality of circumferentially spaced slots formed therein that divide said upper portion into a plurality of fingers;
   (b) a nut having a longitudinally extending second bore that tapers upwardly and inwardly and a third longitudinally extending bore of constant transverse cross section formed therein, which second bore has third threads formed therein that are capable of engaging said second threads, with said third bore having fourth threads formed therein that are in a direction opposite to that of the threads on said threaded portion; and
   (c) a drive bolt comprising a head and a shank, said shank having fifth threads formed thereon that engage said fourth threads, with said stud bolt being removed from said body by first threading said tubular member on said threaded portion, then forcefully rotating said nut relative to said tubular member with said second and third threads in engagement to permit said nut to force said fingers radially inward for said first threads to exert a first radially directed force on said threaded portion, said drive bolt is rotated with said fourth and fifth threads in engagement to dispose the lower end of said shank in rotatable contact with the upper end of said stud bolt, with further rotation of said drive bolt after said engagement tending to move said nut away from said tubular member, and as said movement continues a portion of the rotating force applied to said drive bolt is transferred from said third threads to said second threads as an inwardly directed force to increase said radially directed force and increase the magnitude of the frictional engagement between said first threads and threaded portion to the extent that there will be no relative rotational movement between said tubular body and stud bolt during the removal of the latter from said body.

2. A device as defined in claim 1 wherein said tubular member is provided with a shoulder having a plurality of wrench engageable faces defined on the exterior surface thereof.

3. A device as defined in claim 2 wherein both said nut and drive bolt are provided with portions that can be removably engaged by a wrench to rotate said nut relative to said tubular member, and said drive bolt relative to said nut.

4. A device for use in removing a stud bolt having a threaded portion projecting from a tapped bore in a rigid body including: a tubular body fabricated from a resilient hard material having a first bore formed therein in which there are first threads that can engage said threaded portion of said stud bolt, said tubular body having a plurality of circumferentially spaced, longitudinally positioned slots that extend inwardly from one end thereof and define a plurality of bendable fingers therebetween, said tubular body having second threads formed on the exterior surface thereof; a nut having third threads that engage said second threads, and fourth threads that are in an opposite direction to said first threads; and a drive bolt that has fifth threads that engage said fourth threads, which drive bolt is adapted to be rotated in said nut until said bolt is in contact with the upper end of said stud bolt portion, said drive bolt when rotated after said contact in the same direction as before said contact tending to move upwardly relative to said nut to concurrently bend said fingers inwardly to increase the fricitonal grip of said third threads on said second threads and to rotate said tubular member in a direction to unscrew said stud bolt from said tapped bore in said body.

5. A device as defined in claim 4 wherein said tubular body has an upwardly and inwardly tapering external surface on which said second threads are formed, and said nut has a tapered bore formed therein in which said third threads are formed.

6. A device as defined in claim 5 wherein said second threads have an upwardly and outwardly extending lower surface, and said third threads have an upwardly and outwardly extending surface that is in slidable contact with said lower surface of said second threads.

References Cited in the file of this patent
UNITED STATES PATENTS

| | | |
|---|---|---|
| 801,767 | Cleveland | Oct. 10, 1905 |
| 915,184 | Keirn | Mar. 16, 1909 |
| 1,516,764 | Dickinson | Nov. 25, 1924 |
| 1,566,691 | Perry | Dec. 22, 1925 |
| 2,391,624 | Heuer | Dec. 25, 1945 |
| 2,719,445 | Gibler | Oct. 4, 1955 |